(12) United States Patent
Caronni et al.

(10) Patent No.: US 7,640,339 B1
(45) Date of Patent: Dec. 29, 2009

(54) METHOD AND APPARATUS FOR MONITORING A NODE IN A DISTRIBUTED SYSTEM

(75) Inventors: Germano Caronni, Menlo Park, CA (US); Raphael J. Rom, Palo Alto, CA (US); Glenn Carter Scott, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1105 days.

(21) Appl. No.: 11/057,605

(22) Filed: Feb. 14, 2005

(51) Int. Cl.
*G06F 15/173* (2006.01)
*G06F 15/177* (2006.01)

(52) U.S. Cl. .................. 709/224; 709/220; 709/223

(58) Field of Classification Search ......... 709/220, 709/223, 224, 238, 249
See application file for complete search history.

(56) References Cited

U.S. PATENT DOCUMENTS

| | | | | |
|---|---|---|---|---|
| 6,112,257 | A * | 8/2000 | Mason et al. ............ | 710/18 |
| 6,119,143 | A * | 9/2000 | Dias et al. ............. | 709/201 |
| 6,263,368 | B1 * | 7/2001 | Martin ................. | 709/224 |
| 6,327,622 | B1 * | 12/2001 | Jindal et al. ........... | 709/228 |
| 6,405,252 | B1 * | 6/2002 | Gupta et al. ............ | 709/224 |
| 6,484,143 | B1 * | 11/2002 | Swildens et al. ......... | 705/1 |
| 6,553,413 | B1 * | 4/2003 | Leighton et al. ......... | 709/219 |
| 6,587,878 | B1 * | 7/2003 | Merriam ................ | 709/224 |
| 6,820,133 | B1 * | 11/2004 | Grove et al. ............ | 709/238 |
| 7,111,061 | B2 * | 9/2006 | Leighton et al. ......... | 709/224 |
| 7,483,391 | B2 * | 1/2009 | Xu et al. ............... | 370/254 |
| 2004/0078490 | A1 * | 4/2004 | Anderson et al. ........ | 709/245 |

OTHER PUBLICATIONS

A. Adya, et al.; "Farsite: Federated, Available, and Reliable Storage for an Incompletely Trusted Environment"; Proceedings of the 5th Symposium on Operating Systems and Design Implementation OSDI; Dec. 2002 (14 pages).
I. Clarke, et al.; "Freenet: A Distributed Anonymous Information Storage and Retrieval System"; Lecture Notes in Computer Science; 2000 (21 pages).
J. Kubiatowicz, et al.; "OceanStore: An Architecture for Global-Scale Persistent Storage"; Proceedings of ACM ASPLOS; Nov. 2000 (12 pages).
A. Rowstron, et al.; "Storage Management and Caching in PAST, a Large-Scale, Peristent Peer-to-Peer Storage Utility"; Symposium on Operating Systems Principles; Oct. 2001 (13 pages).

(Continued)

*Primary Examiner*—Hussein Elchanti
(74) *Attorney, Agent, or Firm*—Osha • Liang LLP

(57) ABSTRACT

A method for monitoring a target node in a distributed system, that includes determining a plurality of neighbor nodes of the target node, determining a plurality of neighbor watch nodes, wherein the plurality of neighbor watch nodes are selected from the plurality of neighbor nodes, monitoring at least one selected from the group consisting of data sent by the target node and data received by the target node, using at least one of the plurality of neighbor watch nodes to obtain tracking information, and determining, using at least one the plurality of neighbor watch nodes, an action to perform using the tracking information and a response policy, wherein the action is specified in the response policy, wherein the distributed system implements an overlay network for message delivery.

13 Claims, 4 Drawing Sheets

OTHER PUBLICATIONS

S. Quinlan, et al.; "Venti: A New Approach to Archival Storage"; Proceedings of the FAST 2002 Conference on File and Storage Technologies; First USENIX Conference on File and Storage Technologies; Jan. 2002 (14 pages).

A. Muthitacharoen, et al.; "Ivy: A Read/Write Peer-to-Peer File System"; Proceedings of the 5$^{th}$ USENIX Symposium on Operating Systems Design and Implementation (OSDI '02); Dec. 2002 (23 pages).

F. Dabek, et al.; "Towards a Common API for Structured Peer-to-Peer Overlays"; Proceedings of 2$^{nd}$ International Workshop on Peer-to-Peer Systems (IPTPS '03), Feb. 2003 (11 pages).

I. Stoica, et al.; "Chord: A Scalable Peer-to-Peer Lookup Service for Internet Applications"; Proceedings of the SIGCOMM 2001 Conference on Applications, Technologies, Architectures, and Protocols for Computer Communications; Aug. 2001 (12 pages).

B. Zhao, et al.; "Tapestry: A Resilient Global-Scale Overlay for Service Deployment"; IEEE Journal on Selected Areas in Communications; Jan. 2004 (15 pages).

A. Rowstron, et al.; "Pastry: Scalable, Decentralized Object Location and Routing for Large-Scale Peer-to-Peer Systems"; Lecture Notes in Computer Science; 2001 (22 pages).

C. Greg Plaxton, et al.; "Accessing Nearby Copies of Replicated Objects in a Distributed Environment"; ACM Symposium on Parallel Algorithms and Architectures, Jun. 1997 (23 pages).

M. Castro, et al.; "Practical Byzantine Fault Tolerance"; Symposium on Operating Systems Design and Implementation; Feb. 1999 (14 pages).

D. B. Terry, et al.; "Managing Update Conflicts in Bayou, a Weakly Connected Replicated Storage System"; Proceedings of the Fifteenth ACM Symposium on Operating Systems Principles; Dec. 1995 (12 pages).

D. Boneh, et al.; "Efficient Generation of Shared RSA Keys"; Journal of the ACM; 2001 (21 pages).

Y. Frankel, et al.; "Robust Efficient Distributed RAS-Key Generation"; Proc. 30$^{th}$ Annual ACM Symposium on Theory of Computing (STOC); May 1998 (10 pages).

\* cited by examiner

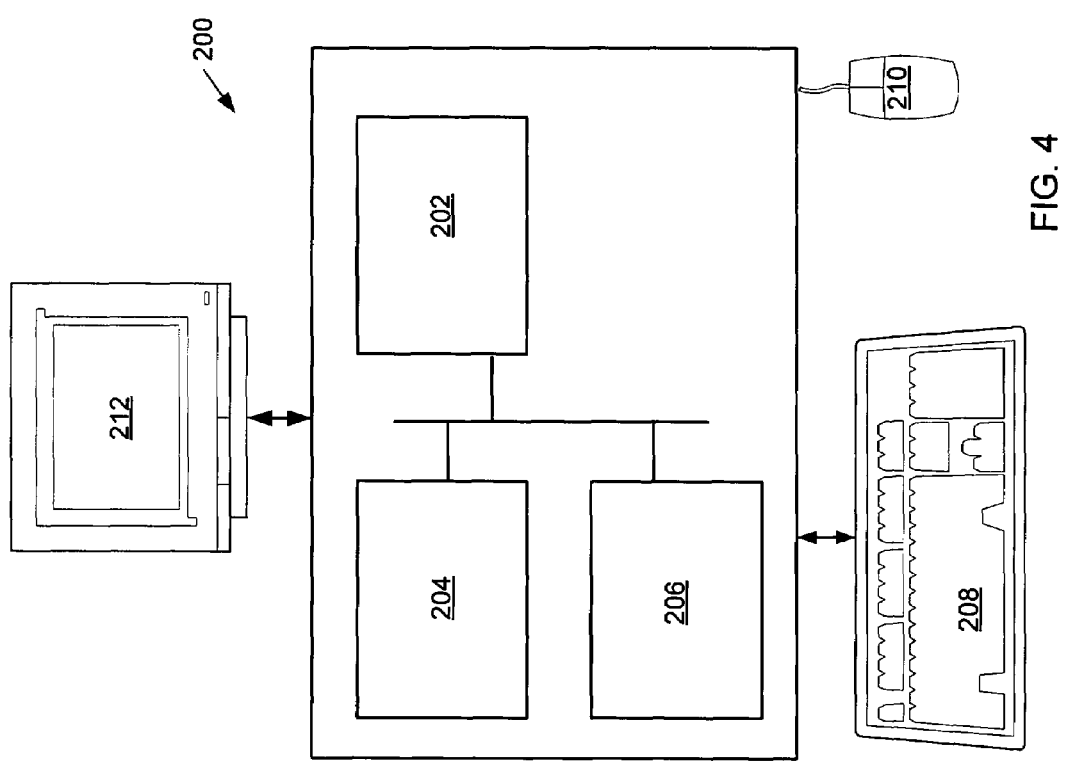

METHOD AND APPARATUS FOR MONITORING A NODE IN A DISTRIBUTED SYSTEM

BACKGROUND

A distributed system typically includes a number of interconnected nodes. The nodes typically include a processor and memory (e.g., Random Access Memory (RAM)). In addition, the nodes also include the necessary hardware and software to communicate with other nodes in the distributed system. The interconnected nodes may also communicate with each other using an overlay network. Nodes belonging to the overlay network route messages between each other using the underlying networking infrastructure (e.g., Internet Protocol (IP) and Transmission Control Protocol (TCP), etc.). While the underlying network infrastructure has the information and capability to directly route messages between specific computers, overlay networks typically maintain only partial routing information and rely on successive forwarding through intermediate nodes in order to deliver a message to its final intended destination.

One common use for overlay networks is to build distributed hash tables (DHT). In one implementation, each node in the overlay network is associated with a Globally Unique Identifier (GUID) and stores a part of the DHT. When a node (i.e., the requesting node) requires a piece of data stored on a node (i.e., a target node) in the overlay network, the requesting node determines the GUID associated with target node, which contains the requested data. The requesting node then queries its routing table entries (i.e., the DHT entries) to find the node (i.e., an intermediate node) with the GUID closest to the target node's GUID. The request is then forwarded to the intermediate node. The intermediate node follows the same process, comparing the target node's GUID with the intermediate node's routing table entries. The aforementioned process is repeated until the target node is reached. Typically, the overlay network maintains enough information in the DHT to determine the appropriate intermediate node.

To store data in the aforementioned overlay network, the data is loaded onto a particular node (i.e., a target node) in the overlay network and is associated with a GUID. The node that stores the data subsequently publishes the presence of the GUID on the node. Another node (i.e., the root node) in the network stores the necessary information in its DHT to indicate that the data associated with the GUID is stored in the target node. It is important to note that any given node in the overlay network may operate as both a target node (i.e., stores data) and as a root node (i.e., maintains a DHT). Typically, a given root node is only responsible for a certain range of GUIDs.

SUMMARY

In general, in one aspect, the invention relates to a method for monitoring a target node in a distributed system, comprising determining a plurality of neighbor nodes of the target node, determining a plurality of neighbor watch nodes, wherein the plurality of neighbor watch nodes are selected from the plurality of neighbor nodes, monitoring at least one selected from the group consisting of data sent by the target node and data received by the target node, using at least one of the plurality of neighbor watch nodes to obtain tracking information, and determining, using at least one the plurality of neighbor watch nodes, an action to perform using the tracking information and a response policy, wherein the action is specified in the response policy, wherein the distributed system implements an overlay network for message delivery.

In general, in one aspect, the invention relates to a distributed system, comprising a target node, a plurality of neighbor watch nodes configured to monitor at least one selected from the group consisting of data sent by the target node and data received by the target node, using at least one of the plurality of neighbor watch nodes to obtain tracking information, and determine, using at least one the plurality of neighbor watch nodes, an action to perform using the tracking information and a response policy, wherein the action is specified in the response policy, wherein each of the plurality of neighbor watch nodes is a neighbor of the target node, and wherein the distributed system implements an overlay network for message delivery.

In general, in one aspect, the invention relates to a computer readable medium comprising software instructions for monitoring a target node in a distributed system, comprising software instructions to determine a plurality of neighbor nodes of the target node, determine a plurality of neighbor watch nodes, wherein the plurality of neighbor watch nodes are selected from the plurality of neighbor nodes, monitor at least one selected from the group consisting of data sent by the target node and data received by the target node, using at least one of the plurality of neighbor watch nodes to obtain tracking information, and determine, using at least one the plurality of neighbor watch nodes, an action to perform using the tracking information and a response policy, wherein the action is specified in the response policy, wherein the distributed system implements an overlay network for message delivery.

Other aspects of the invention will be apparent from the following description and the appended claims.

BRIEF DESCRIPTION OF DRAWINGS

FIG. 4 shows a computer system in accordance with one embodiment of the invention.

DETAILED DESCRIPTION

Figure 1:
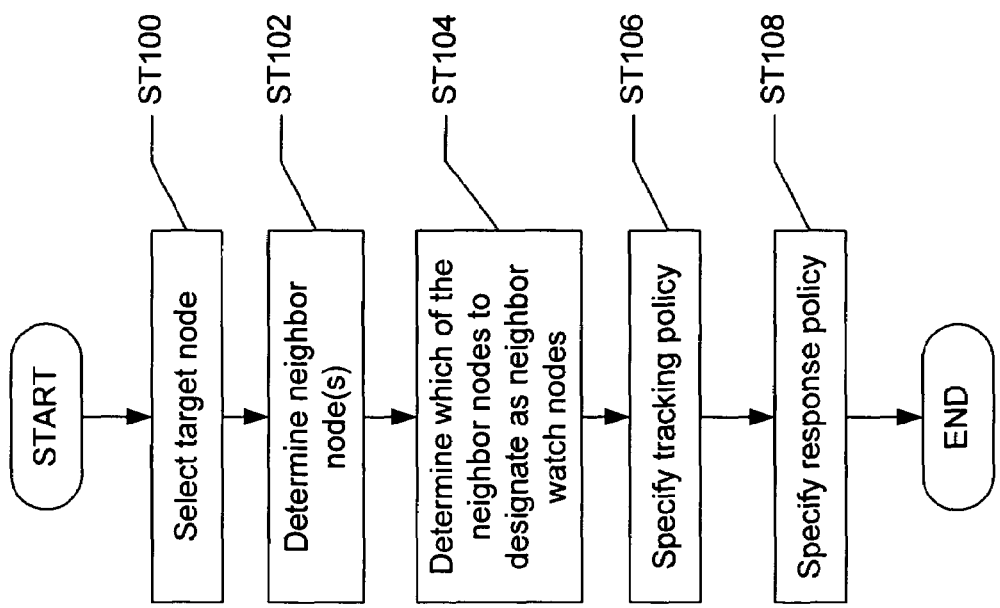
FIGS. 1 and 2 show flowcharts in accordance with one embodiment of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and system for monitoring a target node in a distributed system. More specifically, one or more neighboring nodes of the target node monitor the target node and determine whether the target node is operating within specified operating parameters. In one or more embodiments of the invention, if the target node is operating outside the specified operating parameters, one or more of the neighboring nodes that are monitoring the target node may take an appropriate action based on a response policy. In one embodiment of the invention, the appropriate action may include disconnecting the target node from the overlay network (e.g., using DHT), sending the target node a warning of potential disconnection, not using results generated by the target node, etc.

FIG. 1 shows a flowchart in accordance with one embodiment of the invention. More specifically, FIG. 1 details a method for setting up the distributed system to implement one or more embodiments of the invention. Initially, a target node is selected (ST100). The neighbor node(s) of the target node are subsequently determined (ST102). In one embodiment of the invention, the neighbor node(s) correspond to the nodes that are directly connected to the target node. In one embodiment of the invention, the neighbor node(s) of a given target node are determined using a distributed hash table (DHT). More specifically, the DHT includes the necessary information to route messages from the target node to the neighbor node(s). Thus, the neighbor node(s) of a given target node may be identified using the entries in the DHT residing in (or associated with) the target node. Those skilled in the art will appreciate that neighboring node(s) may be determined using standard DHT forwarding and DHT routing mechanisms.

Once the neighbor node(s) have been determined, a subsequent determination is made about which of the neighbor node(s) will be designated to monitor the target node (i.e., neighbor watch nodes) (ST104). In one embodiment of the invention, the aforementioned determination is made using a pre-set policy. For example, the pre-set policy determines the neighbor watch nodes based on the GUIDs of the neighbor node(s). Those skilled in the art will appreciate that any pre-set policy of determining neighbor watch node(s) may be used.

Those skilled in the art will appreciate that in one or more embodiments of the invention, all the neighbor node(s) of a given target node may be neighbor watch nodes. Those skilled in the art will also appreciate that a given target node may only include one neighbor node and, thus, the single neighbor node is set as the neighbor watch node.

Once the neighbor watch nodes have been determined, a tracking policy is specified (ST106). In one embodiment of the invention, the tracking policy specifies the types of data to track (i.e., monitor). More specifically, the neighbor watch nodes include functionality to monitor the data received by the target node and data sent from the target node. Thus, the purpose of the tracking policy is to determine what specific data to monitor. In some embodiments, all the data is monitored. In other embodiments, only specific pieces of data are monitored. In addition, the tracking policy also specifies how to extract (and/or aggregate) relevant information from the data that is monitored. For example, the tracking policy may include one or more algorithms used to determine the average response time of the target node.

In addition to the tracking policy, a response policy is also specified (ST108). The response policy may include, but is not limited to, one or more specified operating parameters for the target node, a voting policy, and one or more actions to be taken if the target node is operating outside the specified operation parameter(s). In one embodiment of the invention, the specified operating parameter(s) may include any operating parameter of interest. For example, the specified operating parameter(s) may indicate the minimum level of reliability of the target node (e.g., the percentage of time that the target node responds in a timely manner), the minimum level of availability of target node (e.g., the percentage of time the target node is online), the minimum level of validity of data generated by the target node (e.g., the percentage of time that the target node provides valid data). The above examples are for illustration purposes only and are not intended to limit the scope of the invention.

In one embodiment of the invention, the voting policy specifies how the neighbor watch nodes collectively determine whether to take action (in some cases what action to take) when the target node is operating outside the specified operating parameters. In one embodiment of the invention, the voting policy specifies the minimum number of neighbor watch nodes which must agree to take action on the target node. Further, in one embodiment of the invention, the voting policy may specify a minimum number of neighbor watch nodes required to reach a quorum (i.e., the number of neighbor watch nodes that must participate in the voting) and the percentage of the quorum that must vote in favor of taking action. Those skilled in the art will appreciate that other policies governing voting by the neighbor watch nodes may be included in the voting policy. In one embodiment of the invention, the voting policy prevents one neighbor watch node from unilaterally taking an action (e.g., disconnecting the target node from the distributed network) on the target node.

In one embodiment of the invention, the actions listed in the response policy may include, but are not limited to: (1) disconnecting the target node from the distributed network (i.e., the neighbor node(s) stop communicating with the target node, thereby effectively disconnecting the target node from the network), (2) sending a warning message to the target node that indicates that the target node will be disconnected within a certain time period unless the target node begins to operate within the specified operating parameters, (3) ceasing to use data sent from the target node, etc. Those skilled in the art will appreciate that ST106 and ST108 may be performed in any order and at anytime prior to implementing the invention.

At this stage the distributed system includes the necessary information (e.g., the tracking policy, the response policy, etc.) to implement one or more embodiments of the invention.

Figure 2:
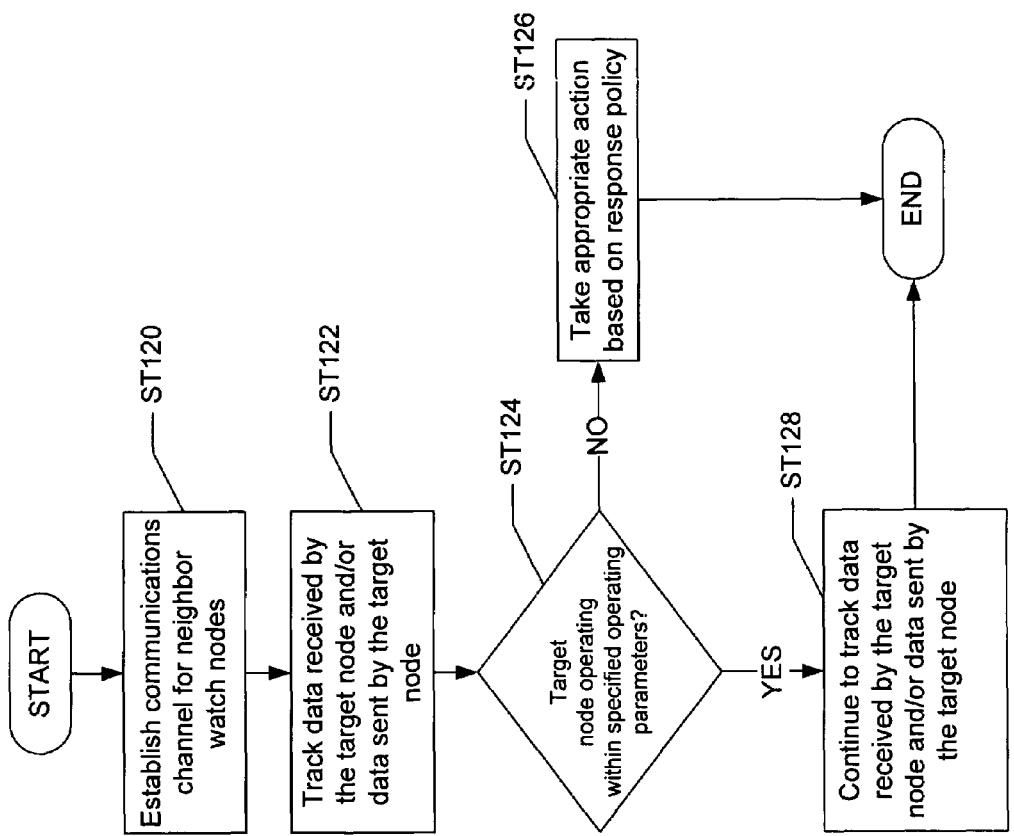

FIG. 2 shows a flowchart of a method for implementing one or more embodiments of the invention. As discussed in FIG. 1 above, the target node and the neighbor watch nodes have already been determined/selected (see ST100 and ST104, respectively). Prior to monitoring the target node, the neighbor watch nodes establish a separate communications channel (i.e., type of communication) (ST120). More specifically, the neighbor watch nodes establish a communications channel that is separate from the communications channel used to communicate with the target node. For example, the target node may communicate with the neighbor node(s) using the overlay network which uses DHT. As discussed above, the overlay network using DHT is "overlayed" on communications channel which uses, for example, TCP/IP. Thus, the communications channel selected by the neighbor watch nodes does not use DHT; rather, the communications channel may use, for example, Transmission Control Protocol (TCP)/Internet Protocol (IP), a wireless communication channel, etc. The purpose of establishing a separate communications channel is to prevent the target node from interfering with the communications between the neighbor watch nodes. Those skilled in the art will appreciate that the neighbor watch nodes may use DHT to communicate as long as the target node can not interfere with the communication between the neighbor watch nodes.

Once the communication channel between the neighbor watch nodes has been established, the neighbor watch nodes proceed to track data sent by the target node and/or data received by the target node (ST122). The tracking of data sent from the target node and/or received by the target node is performed in accordance with the tracking policy. The result of applying the tracking policy to the data received by the target node and/or data sent by the target node is referred to as tracking information. In one embodiment of the invention, the tracking information is communicated to one or more of the neighbor watch nodes via the communication channel established in ST120.

At certain time intervals, the neighbor watch nodes determine whether the target node is operating within the specified operating parameters (ST124). Those skilled in the art will appreciate that other events, as opposed to time intervals, may trigger ST124. Continuing with the discussion of ST124, the neighbor watch nodes uses the tracking information, the voting policy, and the specified operating parameters to determine whether the target node is operating outside the specified operating parameters. In one embodiment of the invention, one of the neighbor watch nodes initiates a vote to take action on the target node. The other neighbor watch nodes then vote to determine whether to take action on the target node. The individual neighbor watch nodes use the generated tracking information as well as the tracking information received from the other neighbor watch nodes, to determine how to vote (i.e. vote to take action or vote not to take action). Depending on the tracking information available to a given neighbor watch node, the results of the vote may not always be unanimous.

If the neighbor watch nodes determine that the target node is operating outside the specified operating parameters, then the neighbor watch nodes may take one or more of actions specified in the response policy (ST126). Alternatively, if the neighbor watch nodes determine that the target node is operating within the normal operating parameters, then the neighbor watch nodes continue to track data sent by the target node and/or data received by the target node (ST128).

Figure 3:
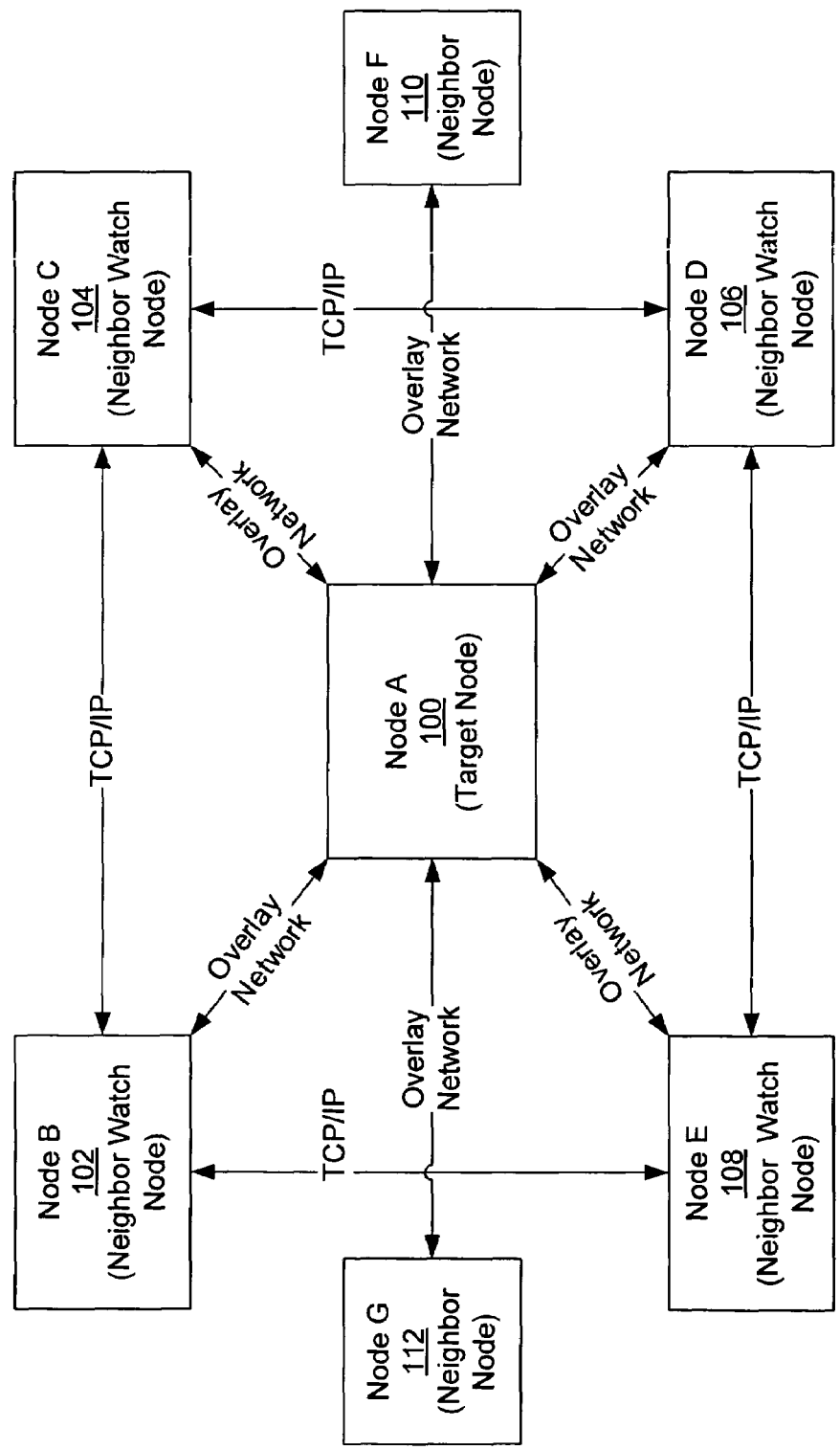
FIG. 3 shows an example of a distributed system implementing one or more embodiments of the invention.

FIG. 3 shows an example of a distributed system implementing one or more embodiments of the invention. The distributed system shown in FIG. 3 includes seven nodes, namely, Node A (100), Node B (102), Node C (104), Node D (106), Node E (108), Node F (110), and Node G (112). In the distributed system shown in FIG. 3, Node A (100) is the target node. Thus, Node B (102), Node C (104), Node D (106), Node E (108), Node F (110), and Node G (112) are the neighbor nodes of Node A (100). As shown, each of the neighbor nodes (i.e., Node B (102), Node C (104), Node D (106), Node E (108), Node F (110), and Node G (112)) communicate with Node A (100) using an overlay network which uses DHT to route messages.

As discussed above, in one or more embodiments of the invention, a subset of the neighbor nodes may be designated as neighbor watch nodes. In FIG. 3, Node B (102), Node C (104), Node D (106), Node E (108) are designated as neighbor watch nodes while Node F (110) and Node G (112) are not designated as neighbor watch nodes. Once the neighbor watch nodes are designated, a separate communication channel is established. In FIG. 3, the neighbor watch nodes use a communication channel which transmits messages using TCP/IP. Note that the communication channel used by the neighbor nodes is not accessible by Node A (100).

Once the communication channel between the neighbor nodes is established, the neighbor watch nodes may proceed to monitor/track data received by the Node A (100) and/or data sent from the target node. In one embodiment of the invention, neighbor watch nodes track data received by the Node A (100) and/or data sent from Node A (100) by, for example, intercepting messages communicated to and/or from Node A (100) via the overlay network using DHT.

In the distributed system shown in FIG. 3, if the neighbor watch nodes determine that Node A (100) is operating outside the specified operating parameters, then the neighbor nodes (i.e., Node B (102), Node C (104), Node D (106), Node E (108), Node F (110), and Node G (112)) may disconnect Node A (100) from the distributed system by removing entries corresponding to Node A (100) from their respective DHTs.

The aforementioned discussion of the invention described an embodiment of the invention in which the target node was known. In another embodiment of the invention, each node in the distributed system includes functionality to determine neighbor node(s) of a target node, functionality to determine neighbor watch nodes from the neighbor node(s), functionality to implement the tracking policy, and functionality to implement the response policy. In this embodiment, the nodes (which include the aforementioned functionality) are deployed in the distributed system. At some point during the operating of the distributed system, a target node may be selected. Once the target node is selected, the neighbor nodes of the target node begin to monitor the target node (and take action on the target node if the target node is operating outside the specified operating parameters). At a later point, the target node may no longer be a target node (i.e., there is no need to monitor the node). Once there is no target node, the neighbor watch node(s) cease monitoring the target node.

Those skilled in the art will appreciate that the distributed system may include more than one target node. Further, a given node may be both a target node and a neighbor watch node. Moreover, a given node may be a neighbor node and a neighbor watch node for more than one target node.

An embodiment of the invention may be implemented on virtually any type of computer regardless of the platform being used. For example, as shown in FIG. 4, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be located at a remote location and connected to the other elements over a network. Further, software instructions to perform embodiments of the invention may be stored on a computer readable medium such as a compact disc (CD), a diskette, a tape, a file, or any other computer readable storage device.

As noted above, embodiments of the invention may be used to determine the validity of data generated by a target node. In one embodiment of the invention, the validity of data generated by the target node may be determined by having two or more of the neighbor watch nodes send a request for a certain piece of data. Once each of the neighbor watch nodes which sent the request receives a response with the certain piece of data, the aforementioned neighbor watch nodes compare the responses received from the target node to determine whether the certain piece of data is valid. If the responses received by the individual neighbor watch nodes which requested the certain piece of data are outside a limited and/or pre-specified range, then the data generated by the target node is deemed to be invalid.

Alternatively, neighbor nodes may temporarily hold the data sent from the target node until the neighbor watch nodes reach an agreement (using the voting policy) as to what data should be sent from the target node (i.e., whether the data sent from the target node is valid). Once an agreement is reached, the neighbor watch nodes signal the neighbor nodes (which include the neighbor watch nodes) to forward the temporarily held data to the destination if the temporarily held data corresponds to data which the neighbor watch nodes agreed is valid.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for monitoring a target node in a distributed system, comprising:
   determining a plurality of neighbor nodes of the target node, wherein each one of the plurality of neighbor nodes is directly connected to the target node;
   determining a plurality of neighbor watch nodes, wherein the plurality of neighbor watch nodes is selected from the plurality of neighbor nodes;
   monitoring at least one selected from the group consisting of data sent by the target node and data received by the target node, using at least one of the plurality of neighbor watch nodes to obtain tracking information; and
   determining, using at least one the plurality of neighbor watch nodes, an action to perform using the tracking information and a response policy, wherein the action is specified in the response policy, and wherein the response policy comprises a specified operating Parameter of the target node and a voting policy which specifies the number of neighbor watch nodes that must agree prior to initiating the action,
   wherein the distributed system implements an overlay network for message delivery, and
   wherein the action comprises sending a warning message to the target node if the tracking information indicates that the target node is operating outside the specified operating parameters, and disconnecting the target node from the distributed system, if the target node does not begin operating in the within specified operating parameters within a pre-defined period of time.

2. The method of claim 1, wherein the specified operating parameters comprise at least one selected from the group consisting of response time of the target node, reliability of the target node, and validity of a result calculated by the target node.

3. The method of claim 1, wherein the tracking information is determined from monitoring at least one selected from the group consisting of data sent by the target node and data received by the target node using a tracking policy, wherein the tracking policy specifies how to analyze the data to obtain the tracking information.

4. The method of claim 1, wherein the plurality of neighbor nodes and the target node communicate using a first communication mechanism, and the plurality of neighbor watch nodes communicate using a second communication mechanism.

5. The method of claim 1, wherein determining at least one neighbor watch node comprises using a pre-set policy.

6. The method of claim 1, wherein determining the plurality of neighbor nodes comprises using a distributed hash table.

7. A distributed system, comprising:
   a target node;
   a plurality of neighbor watch nodes configured to:
     monitor at least one selected from the group consisting of data sent by the target node and data received by the target node, using at least one of the plurality of neighbor watch nodes to obtain tracking information, and
     determine, using at least one the plurality of neighbor watch nodes, an action to perform using the tracking information and a response policy, wherein the action is specified in the response policy, wherein the response policy comprises a specified operating parameter of the target node and a voting policy which specifies the number of neighbor watch nodes that must agree prior to initiating the action,
   wherein each of the plurality of neighbor watch nodes is directly connected to the target node,
   wherein the distributed system implements an overlay network for message delivery, and
   wherein the action comprises sending a warning message to the target node if the tracking information indicates that the target node is operating outside the specified operating parameters, and disconnecting the target node from the distributed system, if the target node does not begin to operate in the within specified operating parameters within a certain period of time.

8. The distributed system of claim 7, wherein the specified operating parameters comprise at least one selected from the group consisting of response time of the target node, reliability of the target node, and validity of a result calculated by the target node.

9. The distributed system of claim 7, wherein the tracking information is determined from monitoring at least one selected from the group consisting of data sent by the target node and data received by the target node using a tracking policy, wherein the tracking policy specifies how to analyze the data to obtain the tracking information.

10. The distributed system of claim 7, wherein the plurality of neighbor nodes and the target node communicate using a first communication mechanism, and the plurality of neighbor watch nodes communicate using a second communication mechanism.

11. The distributed system of claim 7, wherein determining at least one neighbor watch node comprises using a pre-set policy.

12. The distributed system of claim 7, wherein determining the plurality of neighbor nodes comprises using a distributed hash table.

13. A computer readable medium comprising software instructions for monitoring a target node in a distributed system, wherein software instructions are executed, by a computer, to perform steps comprising:
   determining a plurality of neighbor nodes of the target node, wherein each one of the plurality of neighbor nodes is directly connected to the target node;
   determining a plurality of neighbor watch nodes, wherein the plurality of neighbor watch nodes is selected from the plurality of neighbor nodes;
   monitoring at least one selected from the group consisting of data sent by the target node and data received by the target node, using at least one of the plurality of neighbor watch nodes to obtain tracking information; and
   determining, using at least one the plurality of neighbor watch nodes, an action to perform using the tracking information and a response policy, wherein the action is specified in the response policy, and wherein the response policy comprises a specified operating parameter of the target node and a voting policy which specifies the number of neighbor watch nodes that must agree prior to initiating the action,
   wherein the distributed system implements an overlay network for message delivery, and
   wherein the action comprises sending a warning message to the target node if the tracking information indicates that the target node is operating outside the specified operating parameters, and disconnecting the target node from the distributed system, if the target node does not begin to operate in the within specified operating Parameters within a certain Period of time.

* * * * *

UNITED STATES PATENT AND TRADEMARK OFFICE
CERTIFICATE OF CORRECTION

PATENT NO. : 7,640,339 B1
APPLICATION NO. : 11/057605
DATED : December 29, 2009
INVENTOR(S) : Caronni et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1355 days.

Signed and Sealed this

Ninth Day of November, 2010

David J. Kappos
*Director of the United States Patent and Trademark Office*